No. 738,078. PATENTED SEPT. 1, 1903.
E. SMELLIE.
ELECTRIC BELT FOR MEDICAL PURPOSES.
APPLICATION FILED APR. 3, 1903.
NO MODEL.

Witnesses
geo. A. Byrne
Fred W. Englert

Inventor
E. Smellie,
By Wilkinson & Fisher,
Attorneys

No. 738,078. Patented September 1, 1903.

UNITED STATES PATENT OFFICE.

EBENEZER SMELLIE, OF GLASGOW, SCOTLAND.

ELECTRIC BELT FOR MEDICAL PURPOSES.

SPECIFICATION forming part of Letters Patent No. 738,078, dated September 1, 1903.

Application filed April 3, 1903. Serial No. 150,952. (No model.)

*To all whom it may concern:*

Be it known that I, EBENEZER SMELLIE, a subject of the British King, residing at 54 Gordon street, Glasgow, in the county of Lanark, Scotland, have invented certain new and useful Improvements in Electric Belts for Medical Purposes; and I do hereby declare the following to be a full, clear, and exact description of the invention, such as will enable others skilled in the art to which it appertains to make and use the same.

This invention relates to an electric belt for medical purposes.

The new belt possesses certain novel features in construction and arrangement over belts of a similar character at present in use, and these novel features are clearly pointed out in the claims at the end of this specification.

In order that my said invention may be properly understood, I have hereunto appended an explanatory sheet of drawings, whereon—

Figure 1:
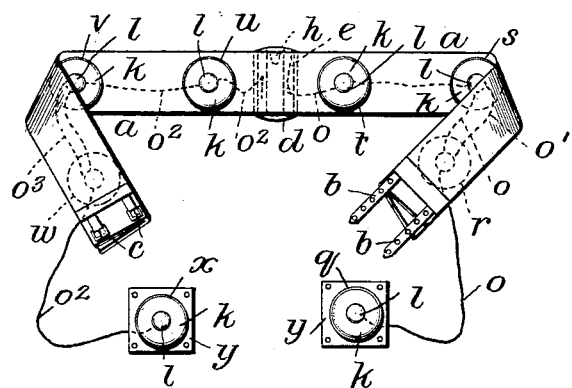
Figures 2, 4, 5:
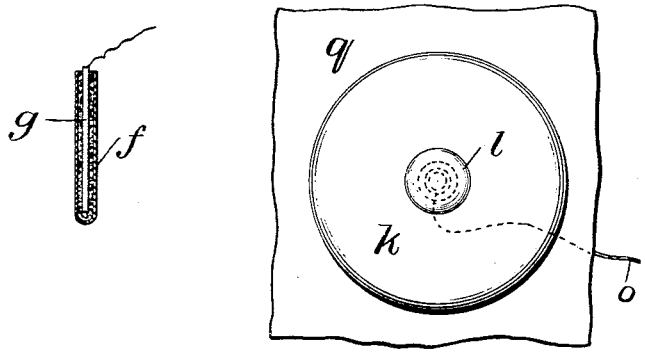
Figure 3:
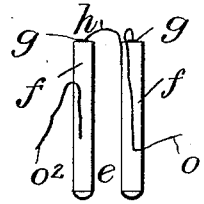

Figure 1 is a view of the complete belt with terminal contact-disks attached. Fig. 2 is a full-sized plan, and Fig. 3 a similar section of one of the contact-disks. Fig. 4 is a vertical section of one of the battery-cells. Fig. 5 is a view of the battery.

The belt $a$ may be made of leather lined with flannel or some similar material that will retain the warmth of the body, and its ends are provided with any usual form of fastening arrangement, such as straps $b$ and buckles $c$. A pocket $d$ is made in the belt for the reception of a small galvanic battery $e$, (Fig. 5,) which preferably consists of two zinc cells $f$ with copper electrodes $g$ and a packing of cotton-wool, which may be saturated with a suitable electrolyte, such as pure distilled water or sal-ammoniac solution. The copper electrodes may be made of strands of copper wire. Any other suitable form of battery may, however, be used. The connecting-wire $h$ is of course led from the copper electrode of the one cell to the zinc of the other, as shown at Fig. 5.

The main feature of my invention is the construction of the "contact-disks," as I may term them. In making the contact-disk $q$, Figs. 2 and 3, for instance, a large disk $k$ of zinc is punched from a zinc sheet. The disk is made with a central hole and a beveled or dished rim. A small cup-headed copper stud or disk $l$ is also punched from copper sheeting, and a copper rivet $m$ is soldered to this disk $l$. The tail of the copper rivet is pushed through the hole in the zinc disk and then soldered in position. Thereafter the tail of the rivet is pushed through a hole in the cloth $n$ of the belt. The wire $o$ from the battery is bared at its end for a short distance and pushed through a hole in the center of a rubber washer $i$, which latter, along with the wire, is thereafter slipped onto the end of the tail of the rivet. The wire is now twisted around the tail of the rivet, and one or two small copper washers $p$ are subsequently fitted on the end of the rivet, which is finally riveted up gently by means of a hammer, so as to secure the disks $l\,k$, rubber washer, wiring, and copper washers $p$ in place and force them all tightly together. The rubber washer tends to keep the connections clean.

Every alternate contact-disk is made in the manner above described; but the intermediate contact-disks are made somewhat differently—that is to say, instead of each one having a large disk $k$ and copper stud $l$ and rivet $m$ they have each a large copper disk with corresponding zinc stud and zinc rivet. Thus in Fig. 1 the contact-disks $q\,s\,u\,w$ have each a large zinc disk with copper stud, and the other contact-disks, $r\,t\,v\,x$, have each a large copper disk with zinc stud.

I connect up the contact-disks as follows: I lead a wire $o$ from the copper of the right-hand cell of the battery to the copper disk $k$ of the contact $t$ and from thence to the copper disk of the contact $r$ and from thence to the zinc disk of the terminal contact $q$. I also lead a branch wire or connection $o'$ from the contact $r$ to the zinc disk of contact $s$, which latter is a terminal contact. In the same way I lead a wire $o^2$ from the zinc of the left-hand cell of the battery to the zinc disk of contact $u$ and then to the zinc disk of contact $w$ and finally to the copper disk of the terminal contact $x$. I also lead a branch wire or connection $o^3$ from the zinc disk of contact $w$ to the copper disk of contact $v$. It will thus be seen that the contacts $q\,s\,v\,x$ form terminals. It is important that the wires should be led direct from the zinc of the battery to the zincs of the contacts and from the copper of the battery to the coppers of the contacts in the manner before explained. The wires are insulated, and they may be connected to the rivets of the disks in any suitable manner. The terminal contact-disks $q\,x$ are secured to pieces of flannel $y$, provided with eyelets at the corners, through which suspending cords can be passed, so as to hold them in place on any desired part of the body.

Having now particularly described and ascertained the nature of my said invention and in what manner the same is to be performed, I declare that what I claim is—

1. A "contact-disk" for electric belts, consisting of a large disk made of one kind of metal, and a small central disk or stud for uniting said large disk to the web of the belt, one of said disks being electropositive in relation to the other, substantially as described.

2. The combination in an electric belt, of a battery made of zinc cells with copper electrodes inserted in them and provided with a suitable electrolyte and copper and zinc contact-disks, the wire from the copper of the battery being led direct to the copper contact-disks, and the wire from the zinc of the battery being led direct to the zinc contact-disks, substantially as hereinbefore set forth.

In testimony whereof I affix my signature in presence of two witnesses.

EBENEZER SMELLIE.

Witnesses:
I. H. PEARSON,
D. B. M. CONECHY.